(12) United States Patent
Lange et al.

(10) Patent No.: US 7,212,337 B2
(45) Date of Patent: May 1, 2007

(54) ARRANGEMENT IN THE ILLUMINATION BEAM PATH OF A LASER SCANNING MICROSCOPE

(75) Inventors: Ralph Lange, Jena (DE); Stefan Wilhelm, Jena (DE); Ulrich Meisel, Jena (DE); Matthias Reich, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 206 days.

(21) Appl. No.: 10/888,098

(22) Filed: Jul. 9, 2004

(65) Prior Publication Data
US 2005/0046932 A1 Mar. 3, 2005

(30) Foreign Application Priority Data
Jul. 11, 2003 (DE) ................. 103 32 062

(51) Int. Cl.
*G02B 21/06* (2006.01)
(52) U.S. Cl. ............... 359/385; 359/381; 359/388
(58) Field of Classification Search ............... 359/368, 359/381, 385, 388
See application file for complete search history.

(56) References Cited

U.S. PATENT DOCUMENTS 3,813,172 A * 5/1974 Walker et al. ............. 356/225
6,486,458 B1 * 11/2002 Schoeppe et al. .......... 250/205
6,624,930 B1 * 9/2003 Danner et al. ............. 359/359
6,683,735 B2 * 1/2004 Stuckey .................... 359/831
2004/0047032 A1 * 3/2004 Gonschor et al. .......... 359/368

FOREIGN PATENT DOCUMENTS

| | | |
|---|---|---|
| DE | 197 02 753 | 7/1998 |
| DE | 198 29 981 | 1/2000 |

* cited by examiner

Primary Examiner—Drew A. Dunn
Assistant Examiner—Joshua L. Pritchett
(74) Attorney, Agent, or Firm—Reed Smith LLP

(57) ABSTRACT

An arrangement in the illumination beam path of a laser scanning microscope, comprising a mirror which can be introduced into the beam path for coupling in at least one additional wavelength, and a method for the operation of a laser scanning microscope with a mirror which can be swiveled in rapidly for coupling at least one additional wavelength into the illumination beam path, wherein the swiveling process is synchronized with the illumination control by a control unit in such a way that at least one additional wavelength is coupled into the illumination beam path when the mirror is swiveled out.

6 Claims, 4 Drawing Sheets

Arrangement of a laser module of a LSM with user port

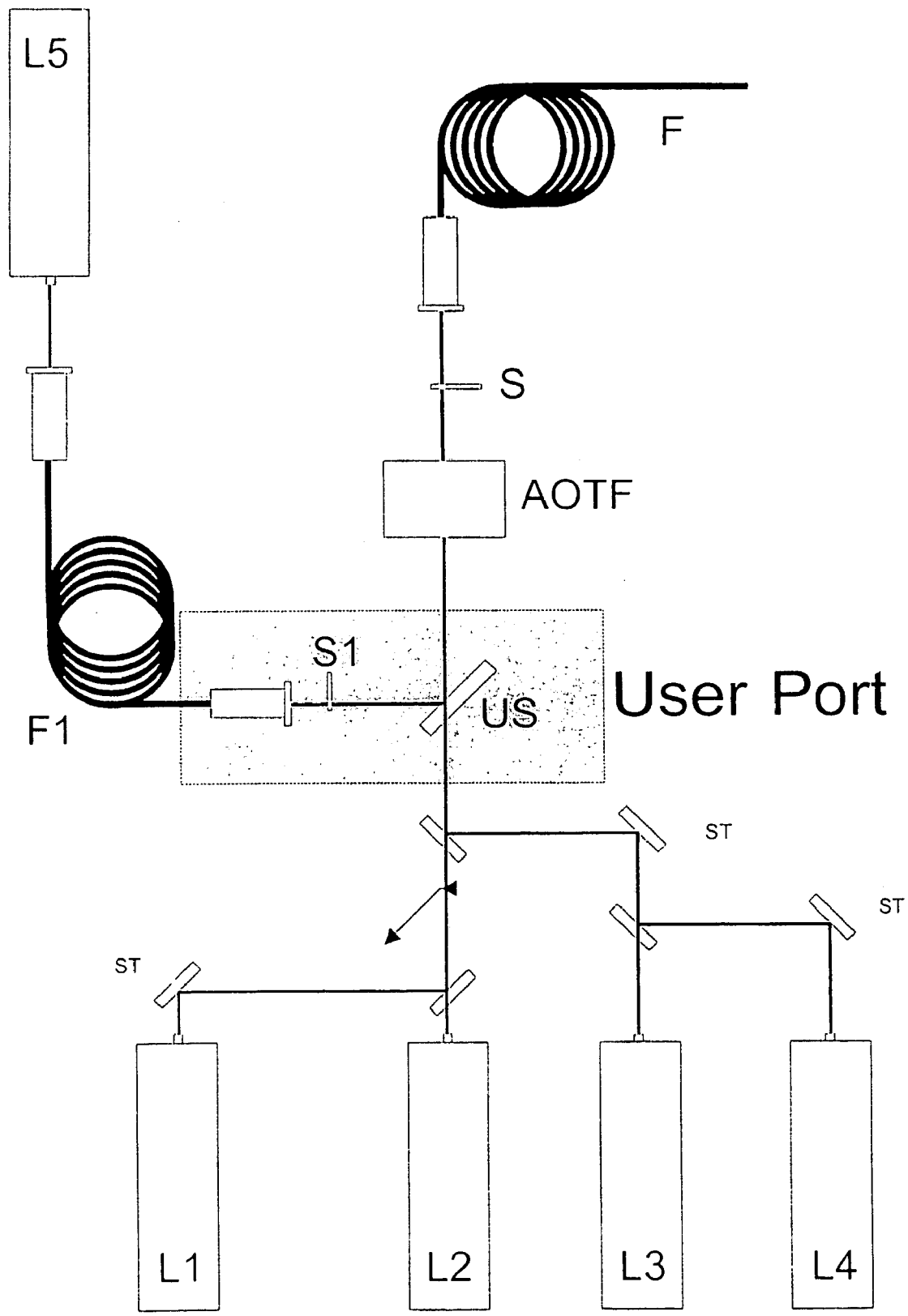
Figure 1: Arrangement of a laser module of a LSM with user port

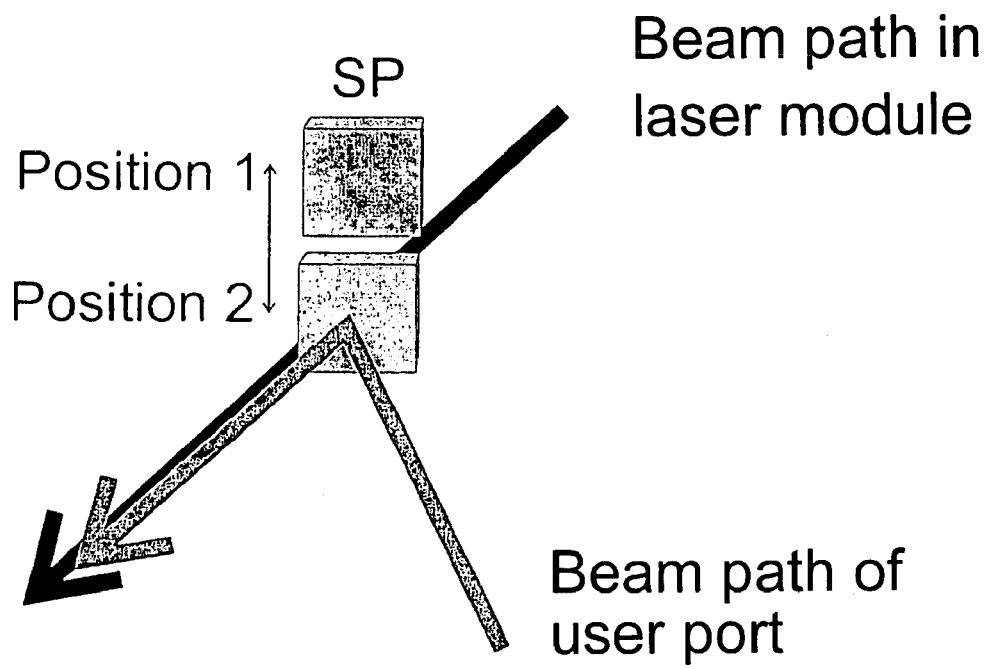
Figure 2: Optical switching principle using a displaceable mirror
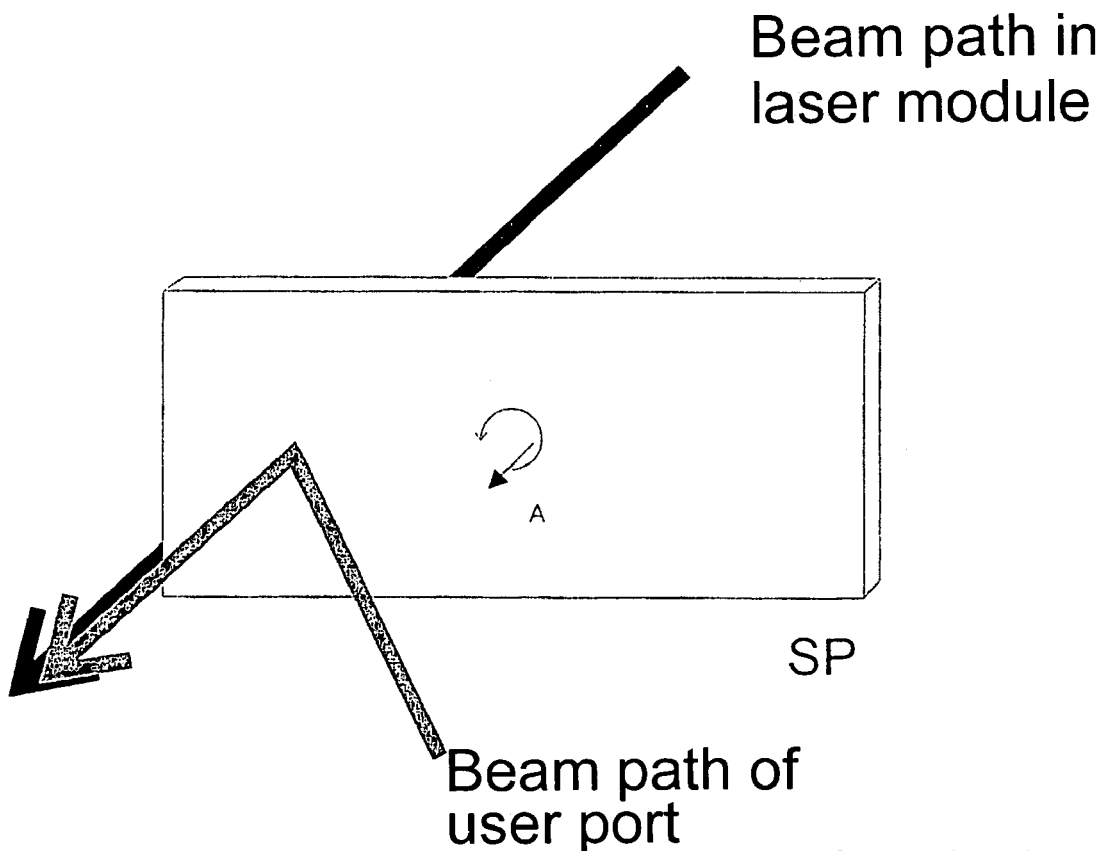
Figure 3: Optical switching principle using a rotating mirror in the form of a rotor element

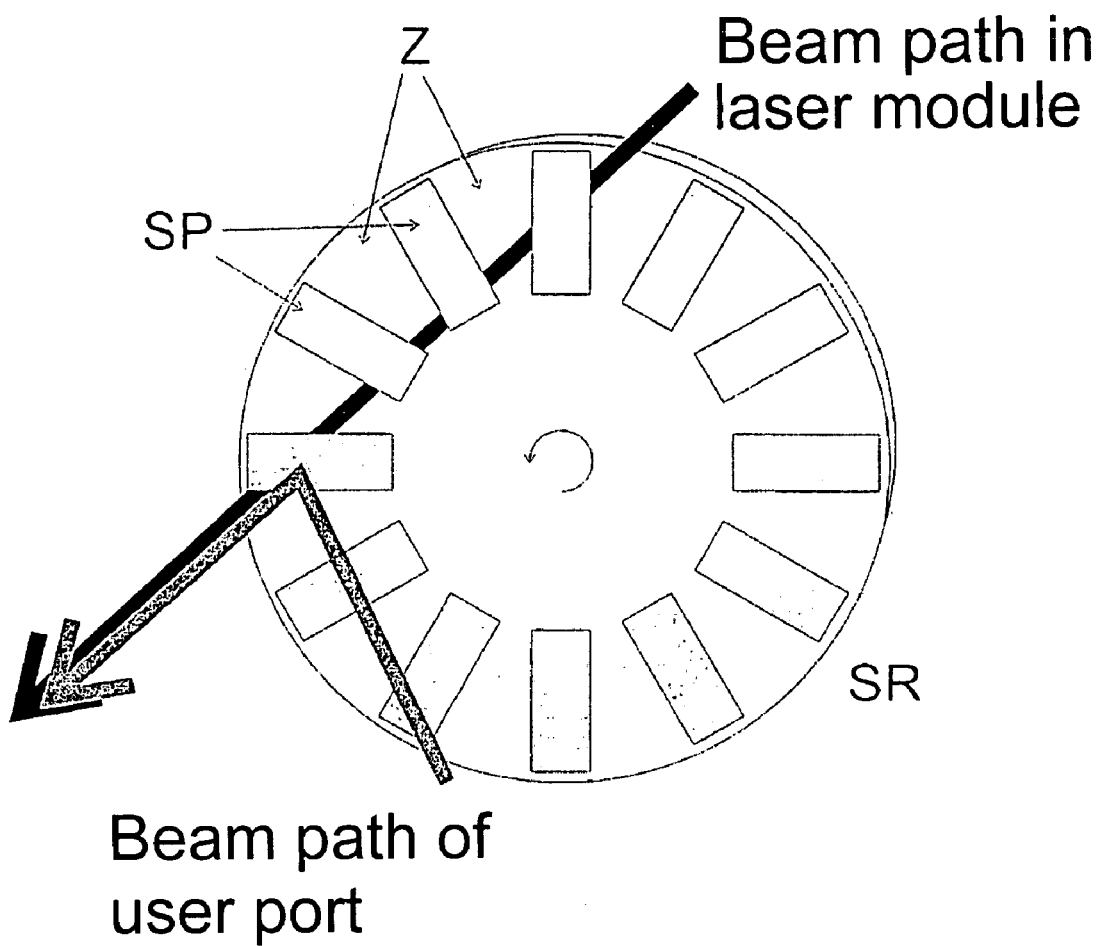
Figure 4: Optical switching principle using a multiply-segmented rotating mirror

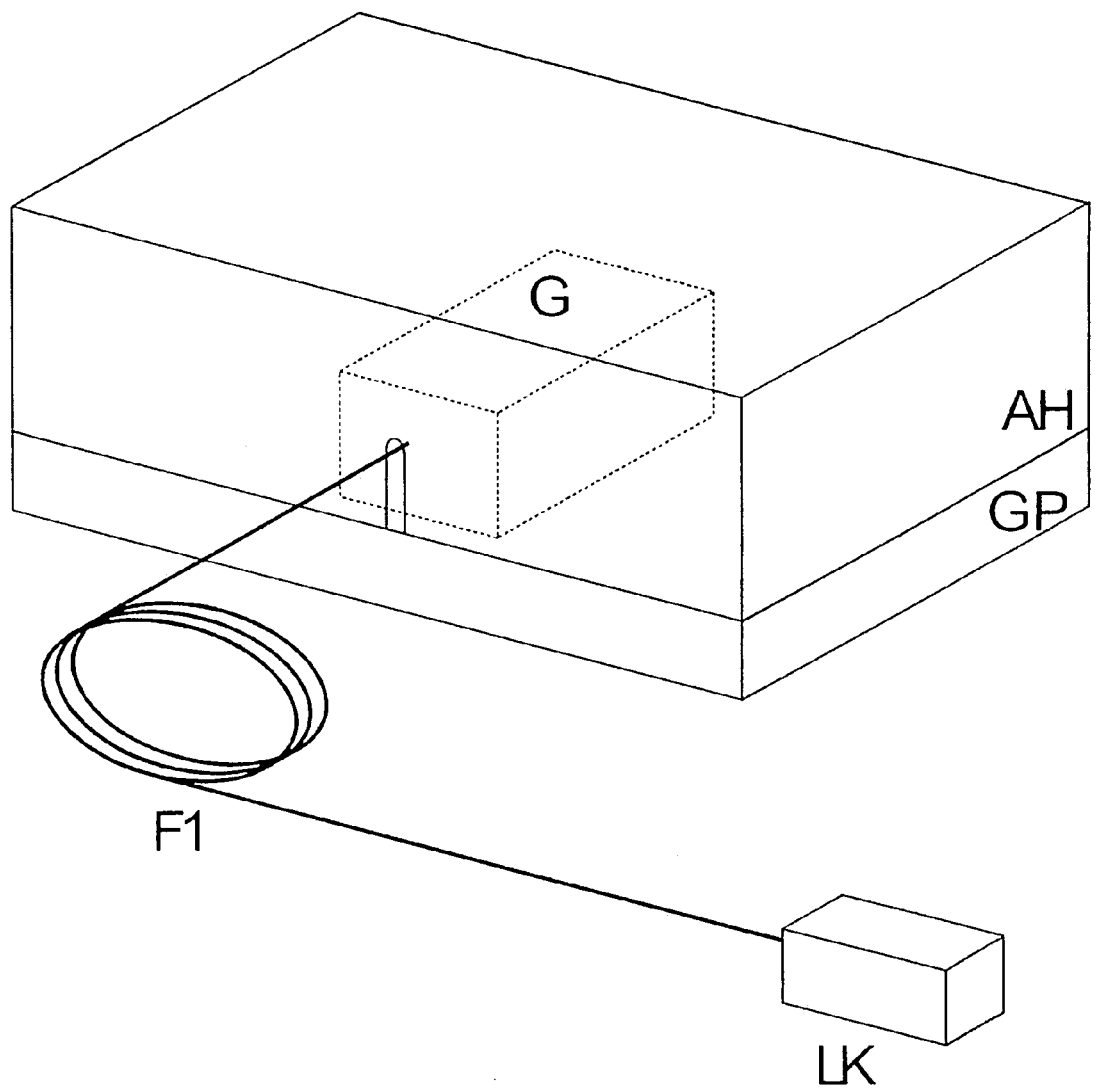
Figure 5: User port installed in the laser module

ARRANGEMENT IN THE ILLUMINATION BEAM PATH OF A LASER SCANNING MICROSCOPE

CROSS-REFERENCE TO RELATED APPLICATION

This application claims priority of German Application No. 103 32 062.8, filed Jul. 11, 2003, the complete disclosure of which is hereby incorporated by reference.

BACKGROUND OF THE INVENTION a) Field of the Invention

Excitation wavelengths are offered which can be realized by means of a suitable mechanical integration of corresponding standard laser beam sources in a laser module. Apart from these standard lasers, however, customers often desire to use other wavelengths or higher-output laser beam sources for special excitation processes in the LSM. However, mechanical integration into the existing construction would require extensive special modifications that entail high costs and long delivery times. Therefore, there is a need for an economical arrangement allowing laser radiation whose output and wavelength can be optionally selected within a wide range to be coupled into the excitation beam path of a LSM.

b) Description of the Related Art

It is known from the "Handbook of Biological Confocal Microscopy", Mar. 02, 1995, page 151 (E. H. K. Stelzer) to couple a plurality of lasers into the laser scanning microscope by means of a light-conductive fiber.

SOLUTION AND SUMMARY OF THE INVENTION

The spatial overlapping of the user port beam with the optical beam path of the standard lasers in the laser module is carried out by means of an optical switching element. Ideally, this switching element has a high reflectivity over a large spectral region. The switching process is preferably carried out mechanically.

A mechanical switching process between the two optical channels can be carried out in principle by displacing a mirror element between two fixed positions or by a rotating movement. In every case, it is advantageous that the reflector element has spatially narrowly defined transition areas between reflecting and transmitting areas of typically less than 1 mm in order to ensure short switching times.

(FIG. 2) In the case of a rotating movement, the mirror element must be constructed in such a way that reflecting and transparent areas alternately traverse the beam path. In the simplest case, the optical element comprises an individual segment which corresponds in shape and function to a rotor (FIG. 3). But optical elements having a plurality of mirror segments are also possible in order to increase the switching frequencies between the user port and standard lasers (FIG. 4). In every case, the rotational position is continuously detected in order to make it possible to synchronize with the rest of the microscope control.

Mechanical stability is achieved by means of a fixed (not detachable by the user) fiber link. The interface for the user is the fiber input into which the radiation of a laser can be coupled by the user with emission wavelengths and outputs that can be selected within wide ranges. The laser radiation is preferably coupled in by means of a compact mechanical manipulator which can be mechanically connected to the laser beam source by the user.

In order to monitor and optimize the efficiency of the beam input coupling, a possibility for monitoring the output exiting at the end of the fiber is advantageously provided in the user port. For example, this can be a photodiode to which a small portion of the laser radiation can be deflected by an optical element. The resulting electrical signal is made available to the user through suitable interfaces, for example, an optical display or an electrical output signal.

The invention is described more fully in the following with reference to the schematic drawings. Further, reference is had to DE19702753A1 for the description of a laser scanning microscope.

BRIEF DESCRIPTION OF THE DRAWINGS

In the drawings:

FIG. 1 illustrates in schematic form an arrangement of a laser module of an LSM with user port;

FIG. 2 illustrates the optical switching principle in accordance with the invention;

FIG. 3 illustrates the optical switching principle in accordance with the invention using a rotating mirror in the form of a rotor element;

FIG. 4 illustrates the optical switching principle in accordance with the invention using a multiply-segmented rotating mirror; and FIG. 5 illustrates a user port installed in the laser module.

DESCRIPTION OF THE PREFERRED EMBODIMENTS

In FIG. 1, the coupling of lasers L1–L4 into a light-conducting fiber F is carried out by means of beam unifiers ST, an AOTF and a shutter S.

Another laser L5 can be reflected in, if desired, by a switching element US, preferably by means of another light-conducting fiber F1 and shutter S1. This switching element US is shown in different constructions in FIGS. 2 and 3.

In FIG. 2, a mirror SP is swiveled into (position 2) or out of the beam path. As a result, the light of the laser L5 is reflected into the beam path only when it is actually required. This can also be carried out very quickly as is shown by way of example in FIGS. 3 and 4.

In FIG. 3, a rectangular mirror element SP is rapidly rotated around an axis of rotation A and in this way periodically reaches the beam path of the input-coupling part.

In FIG. 4, mirror elements SP1 are arranged on a mirror wheel SR, wherein intermediate spaces Z which are transparent to light are located between the mirrors SP1. The mirrors SP are advantageously fastened to or vacuum-deposited on a glass disk.

By synchronizing the detected rotational position of the wheel SR or the rotation of the mirror SP in FIG. 3 with the microscope control, the radiation of the laser 5 can advantageously alternately reach the intermediate spaces Z on the sample by way of the mirrors SP1 or one or more of the lasers L1–L4 by corresponding switching of the AOTF.

In this way, by means of rotational speeds of typically up to 10000 RPM and switching speeds of the AOTF in the µs range, a change in wavelength can be carried out between two successive line scans, which is particularly significant for irradiation of ROI regions on the sample (DE 19829981A1).

As is shown in FIG. 5, the input-coupling module can advantageously be arranged in a stationary housing G which is mounted on the base plate GP of the laser module. A cover hood AH covers the laser module, including the user port. The adjustment of the overlapping of the user port beam path and that of the laser module is carried out one time when the user port is inserted. The laser radiation is guided via a cutout in the cover hood AH into the housing of the user port G by means of a flexible light-conducting fiber F1 which is preferably constructed as a polarization-preserving single-mode fiber. The laser beam coupler LK is connected to the desired laser L5 by the user and the laser beam is coupled into the fiber by suitable mechanical adjustment devices.

While the foregoing description and drawings represent the invention, it will be obvious to those skilled in the art that various changes may be made therein without departing from the true spirit and scope of the present invention.

The invention claimed is:

1. A laser scanning microscope having an arrangement in the illumination beam path, the laser scanning microscope comprising a mirror wheel having a plurality of mirrors wherein each of said mirrors can be introduced into the beam path of said microscope for coupling in at least one additional wavelength by means of a light-conducting fiber, at least one area that is transparent to light located on said mirror wheel between said mirrors, and a control unit for synchronizing the introduction of said mirrors into the beam path with an illumination control such that at least one additional wavelength is coupled into illumination beam path when a said mirror is introduced into the beam path.

2. The laser scanning microscope according to claim 1, wherein an elongated mirror is rotatable around an axis of rotation.

3. The laser scanning microscope according to claim 1, wherein the mirror is part of an insert in the illumination module.

4. The laser scanning microscope according to claim 1, wherein an exchangeable interface is positioned in the illumination beam path.

5. A method for the operation of a laser scanning microscope having an arrangement in the illumination beam path with a mirror wheel having a plurality of mirrors which can be introduced into the beam path of said microscope for coupling in at least one additional wavelength by means of a light-conducting fiber, and at least one area that is transparent to light located on said mirror wheel between said mirrors, comprising introducing at least one of said mirrors into said beam path for coupling in at least one additional wavelength, and synchronizing said introducing with illumination control by a control unit in such a way that at least one additional wavelength is coupled into the illumination beam path when the mirror is introduced into said beam path.

6. The method according to claim 5, wherein the illumination is coupled into the microscope by at least one AOTF whose operation is synchronized with the switching process.

* * * * *